US012263607B2

(12) United States Patent
Werner et al.

(10) Patent No.: US 12,263,607 B2
(45) **Date of Patent: *Apr. 1, 2025**

(54) BLADE PAD ASSEMBLY FOR HAIR CUTTING APPARATUS

(71) Applicant: Andis Company, Sturtevant, WI (US)

(72) Inventors: Edwin A. Werner, Union Grove, WI (US); Jassen R. Miller, Trevor, WI (US)

(73) Assignee: Andis Company, Sturtevant, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/490,297

(22) Filed: Oct. 19, 2023

(65) Prior Publication Data

US 2024/0066732 A1 Feb. 29, 2024

Related U.S. Application Data

(63) Continuation of application No. 17/475,582, filed on Sep. 15, 2021, now Pat. No. 11,826,921, which is a continuation of application No. 16/717,787, filed on Dec. 17, 2019, now Pat. No. 11,148,307.

(60) Provisional application No. 62/782,935, filed on Dec. 20, 2018.

(51) Int. Cl.
*B26B 19/38* (2006.01)

(52) U.S. Cl.
CPC ................................ *B26B 19/3846* (2013.01)

(58) Field of Classification Search
None
See application file for complete search history.

(56) References Cited

U.S. PATENT DOCUMENTS

| | | | | |
|---|---|---|---|---|
| 2,790,236 | A | 4/1957 | Andis | |
| 6,308,415 | B1 | 10/2001 | Sablatschan et al. | |
| 7,010,859 | B2 | 3/2006 | Laube | |
| 8,104,178 | B2 | 1/2012 | Worgull | |
| 8,806,757 | B2 | 8/2014 | Moseman | |
| 9,770,836 | B2 | 9/2017 | Werner | |
| 10,668,635 | B2 | 6/2020 | Sablatschan | |
| 11,148,307 | B2 | 10/2021 | Werner et al. | |
| 11,826,921 | B2 * | 11/2023 | Werner | B26B 19/3846 |
| 2003/0005585 | A1 | 1/2003 | Rizzuto, Jr. et al. | |
| 2008/0216324 | A1 | 9/2008 | Tauer | |
| 2008/0282550 | A1 | 11/2008 | Piwaron | |
| 2011/0173818 | A1 | 7/2011 | Lacov et al. | |
| 2014/0331503 | A1 | 11/2014 | Uit De Bulten et al. | |
| 2016/0279813 | A1 | 9/2016 | Buck, Jr. et al. | |
| 2018/0056533 | A1 | 3/2018 | Johnson | |
| 2018/0126570 | A1 * | 5/2018 | Werner | B26B 19/06 |

(Continued)

FOREIGN PATENT DOCUMENTS

| | | |
|---|---|---|
| GB | 2424202 | 9/2006 |

*Primary Examiner* — Hwei-Siu C Payer
(74) *Attorney, Agent, or Firm* — Reinhart Boerner Van Deuren s.c.

(57) ABSTRACT

A pad assembly is described that retains a blade assembly or set to the body of a hair cutter. The pad assembly reduces random forces generated by the blade assembly and ensures an accurate and repeatable tension is maintained between the inner and outer blades of the blade assembly. The pad assembly acts as an intermediary between the blade assembly and the body of the hair clippers to reduce challenges associated with fasteners directly attaching the blade assembly to the body of the clipper.

18 Claims, 14 Drawing Sheets

(56) References Cited

U.S. PATENT DOCUMENTS

| | | | |
|---|---|---|---|
| 2018/0290317 A1 | 10/2018 | Takada et al. | |
| 2020/0376694 A1 | 12/2020 | Carlucci et al. | |
| 2020/0384661 A1* | 12/2020 | Tringali | H01G 11/52 |
| 2021/0046664 A1 | 2/2021 | Habben et al. | |
| 2022/0001557 A1 | 1/2022 | Werner et al. | |
| 2023/0120824 A1* | 4/2023 | Werner | B26B 19/06<br>30/201 |
| 2024/0066732 A1* | 2/2024 | Werner | B26B 19/3846 |

* cited by examiner

BLADE PAD ASSEMBLY FOR HAIR CUTTING APPARATUS

CROSS-REFERENCE TO RELATED PATENT APPLICATIONS

The present application is a continuation of U.S. application Ser. No. 17/475,582, now U.S. Pat. No. 11,826,921, filed Sep. 15, 2021, which is a continuation of U.S. application Ser. No. 16/717,787, now U.S. Pat. No. 11,148,307, filed on Dec. 17, 2019, which claims the benefit and priority to U.S. Provisional Application No. 62/782,935, filed on Dec. 20, 2018, which are incorporated herein by reference in their entireties.

BACKGROUND OF THE INVENTION

The present invention relates generally to the field of hair cutters. Hair cutters include a blade set having a fixed blade in face-to-face relation with a movable blade. An electric motor drives the movable blade relative to the fixed blade to create a reciprocating motion to cut hair. The present disclosure relates specifically to a pad assembly used to stabilize the blade set during reciprocation.

SUMMARY OF THE INVENTION

One embodiment of the invention relates to a blade assembly for a hair clipper. The blade assembly includes a translating blade, a stationary blade, and a blade pad assembly. The translating and stationary blades have translating teeth. The translating blade and teeth oscillate relative to the stationary blade and teeth. The blade pad assembly includes a pad, a threaded insert within the pad, and a bracket that partially surrounds the pad. The bracket captures the threaded insert within the pad and interconnects the blade assembly to distribute operating loads of the blade assembly and maintain a tensile force between the translating blade and the stationary blade.

Another embodiment of the invention relates to a hair clipper that includes a housing, a drive assembly, an inner blade, an outer blade, and a blade pad assembly. The drive assembly includes a motor that couples to the inner blade to translate inner blade teeth on the inner blade. The outer blade is coupled to the inner blade and includes outer blade teeth. The inner blade teeth oscillate relative to the outer blade teeth to facilitate cutting hair.

The blade pad assembly includes a damper pad, a threaded insert, and a bracket. The damper pad provides a counterweight to dampen operating loads absorbed in the blade pad assembly. The threaded insert insertably couples within the damper pad. The bracket partially surrounds the damper pad to capture the threaded insert and couple the threaded insert within the damper pad. The bracket interconnects the housing to the blade assembly and distributes operating loads of the blade assembly to maintain a tensile force between the inner blade and the outer blade.

Another embodiment of the invention relates to a cordless hair clipper. The cordless hair clipper includes a housing, a drive assembly that includes a motor, a blade assembly, and a blade pad assembly. The blade assembly includes an inner blade and an outer blade. The inner blade is coupled to the drive assembly and includes inner blade teeth on a first end of the inner blade and feet on a second end of inner blade located opposite the first end. The inner blade oscillates to move the inner blade teeth on the inner blade. The outer blade is coupled to the inner blade and includes outer blade teeth. The inner blade teeth oscillate relative to the outer blade teeth to facilitate cutting hair. The blade pad assembly interconnects the inner blade and the outer blade and includes a damper pad, a threaded insert, and a bracket. The damper pad covers the feet of the inner blade to dampen operating loads absorbed in the blade pad assembly. The threaded insert insertably couples within the damper pad. The bracket partially surrounds the damper pad and captures the threaded insert within the damper pad. The bracket interconnects the housing to the blade assembly and distributes operating loads on the blade assembly to maintain a tensile force between the inner blade and the outer blade.

Another embodiment of the invention relates to a pad assembly that includes a bracket spring, a blade pad, and a threaded insert. The pad assembly interconnects the blade assembly to the housing body of a hair cutter device. The pad assembly reduces external variable forces exerted on the pad and retains a more constant tension to apply steady tension on the mating parts of the blade assembly. The pad assembly creates a location to couple the blade assembly to the pad assembly. This configuration reduces or eliminates problems associated with attaching the blade assembly directly to the cutter housing. The pad assembly interconnects the blade assembly to the housing and more evenly distributes forces from the blade assembly generated during operation of the cutter.

Alternative exemplary embodiments relate to other features and combinations of features as may be generally recited.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, a pad assembly forms an interconnecting bracket that includes a pad and a threaded insert, as illustrated. Hair clippers or cutters include a blade assembly coupled to a cutter housing that supports the blade assembly in operation. The outer blade is generally fixed, and the inner blade oscillates to create a cutting action between the teeth of the stationary outer blade and the oscillating inner blade. During operation, loads generated at the blades or within the blade assembly may tend to offset the orientation of the inner blade relative to the outer blade. This can reduce the efficiency of the hair cutters and/or produce galling or fatigue to the blade assembly and/or other components of the hair cutters. Applicant has found that through use of a pad assembly to distribute the loads across the blade assembly, the operating loads are more evenly distributed. The evenly distributed loads reduce wear as well as the required energy input at the motor, resulting in a more efficient hair cutter design.

The bracket is a component part of the pad assembly. The bracket secures the threaded insert of the pad assembly to the pad and interconnects the housing of the cutter body to the blade assembly. The bracket within the pad assembly controls the spring tension to provide an accurate and repeatable tensile force. The precision of the repeated force applied to the inner blade or outer blade of the blade assembly eliminates challenges associated with inaccurate and imprecise tensile loads generated by torqued screws that couple the blade assembly to the cutter housing. For example, the bracket evenly distributes the tensile forces within the spring across the blade pad and improves tension across the pad. The material of the pad assembly and bracket may be selected to enhance or eliminate the need for lubrication between components in the blade assembly. The use of similar materials (e.g., metal alloys) may reduce or eliminate galling between the parts on the pad assembly and the blade assembly.

The term "hair cutter" is inclusive, and refers to any hair grooming device, including, but not limited to, a hair trimmer, a hair clipper, or any other hair cutting or hair grooming device. In addition, the hair grooming device can be suitable for a human, animal, or any other suitable living or inanimate object having hair.

Figure 1:
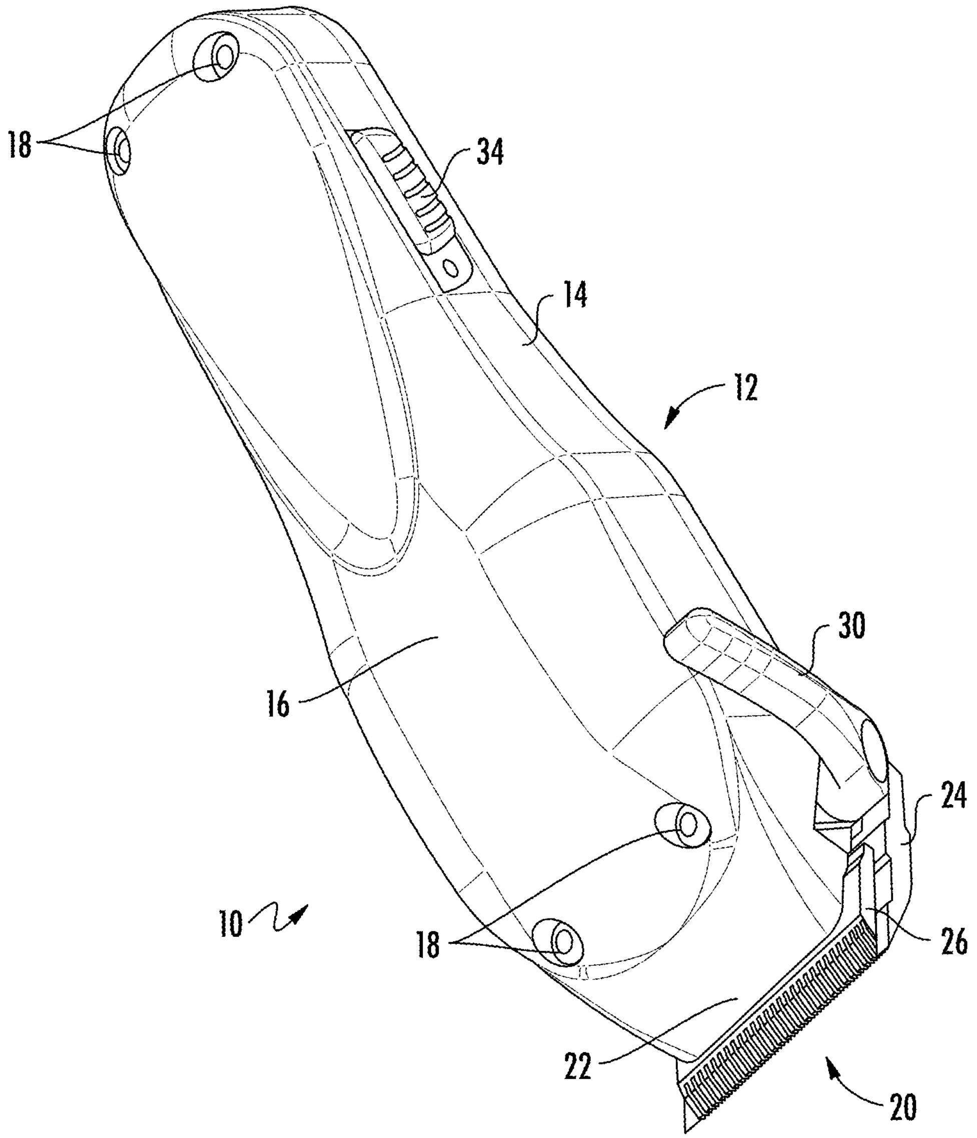
FIG. 1 is a perspective view of a hair cutter, according to an exemplary embodiment.

FIG. 1 illustrates an embodiment of a hair cutter 10 having a handheld body 12. Body 12 is defined by a first or lower housing 14 and a removable cover or upper housing 16. A plurality of fasteners 18 (e.g., bolts, screws, etc.) couple upper housing 16 to lower housing 14. In some embodiments, lower and upper housing 14 and 16 are configured to snap together to reduce or eliminate the need for fasteners. A cutting head assembly 20 is coupled to a first end 22 of body 12. The cutting head assembly 20 includes a lower plate, stationary, or outer blade 24 and an upper plate, cutter, translating, or inner blade 26 that oscillates relative to the outer blade 24. The inner blade 26 is supported on a surface of the outer blade 24 and is movable with respect to the outer blade 24. The inner blade 26 can include a drive socket (not shown) that is configured to engage a reciprocating or oscillating drive assembly 28 (shown in FIG. 2). In some embodiments, the inner blade 26 couples to other structures that engage the reciprocating or oscillating drive assembly 28. The drive assembly 28 is configured to generate oscillating or reciprocating movement of the cutting head assembly 20 to facilitate cutting of hair.

A taper lever 30 is operably connected to the cutting head assembly 20. Taper lever 30 adjusts the position of one of the outer blade 24 or inner blade 26 in relation to the other of the inner blade 26 or outer blade 24. In some embodiments, taper lever 30 couples to inner blade 26 and rotates to move teeth of inner blade 26 relative to teeth on outer blade 24 to increase or decrease a gap 32 (FIGS. 6 and 7) between inner and outer blades 26 and 24. Gap 32 between inner and outer blade teeth can increase or decrease as taper lever 30 is rotated in either direction For example, rotation of taper lever 30 towards the cutting head assembly 20 (e.g., counter-clockwise as viewed in FIG. 1) results in a shorter cut (gap 32 decreases), as edges of outer blade 24 and inner blade 26 teeth are in close proximity (or at a reduced distance) to one another. FIG. 1 illustrates the cutting head assembly 20 configured to make the shorter cut (e.g., with the outer blade 24 and inner blade 26 in close proximity). Rotation of taper lever 30 away from the cutting head assembly 20 (e.g., clockwise as viewed in FIG. 1) results in a longer cut (e.g., gap 32 increases). As one of the outer blade 24 or inner blade 26 is repositioned away from the other of the inner blade 26 or outer blade 24, the edges of the outer blade 24 and inner blade 26 are separated or offset from each other (or separated by a greater distance or not in close proximity), resulting in a longer cut.

A power source is configured to connect to a suitable source of power, such as an outlet, battery, or another source of power. In some embodiments, the power source can be a battery (e.g., using standard battery cells, a rechargeable battery, or a lithium-ion battery) that is positioned within body 12. A switch 34 is positioned on body 12 (and more specifically lower housing 14) for powering the drive assembly 28 (shown in FIG. 2) "on" or "off" The switch 34 is user operable; for example, it can be actuated by a thumb of the user. Positioning the switch 34 into the "on" position provides power to the drive assembly 28 while positioning the switch 34 into the "off" position terminates power to the drive assembly 28.

Figure 2:
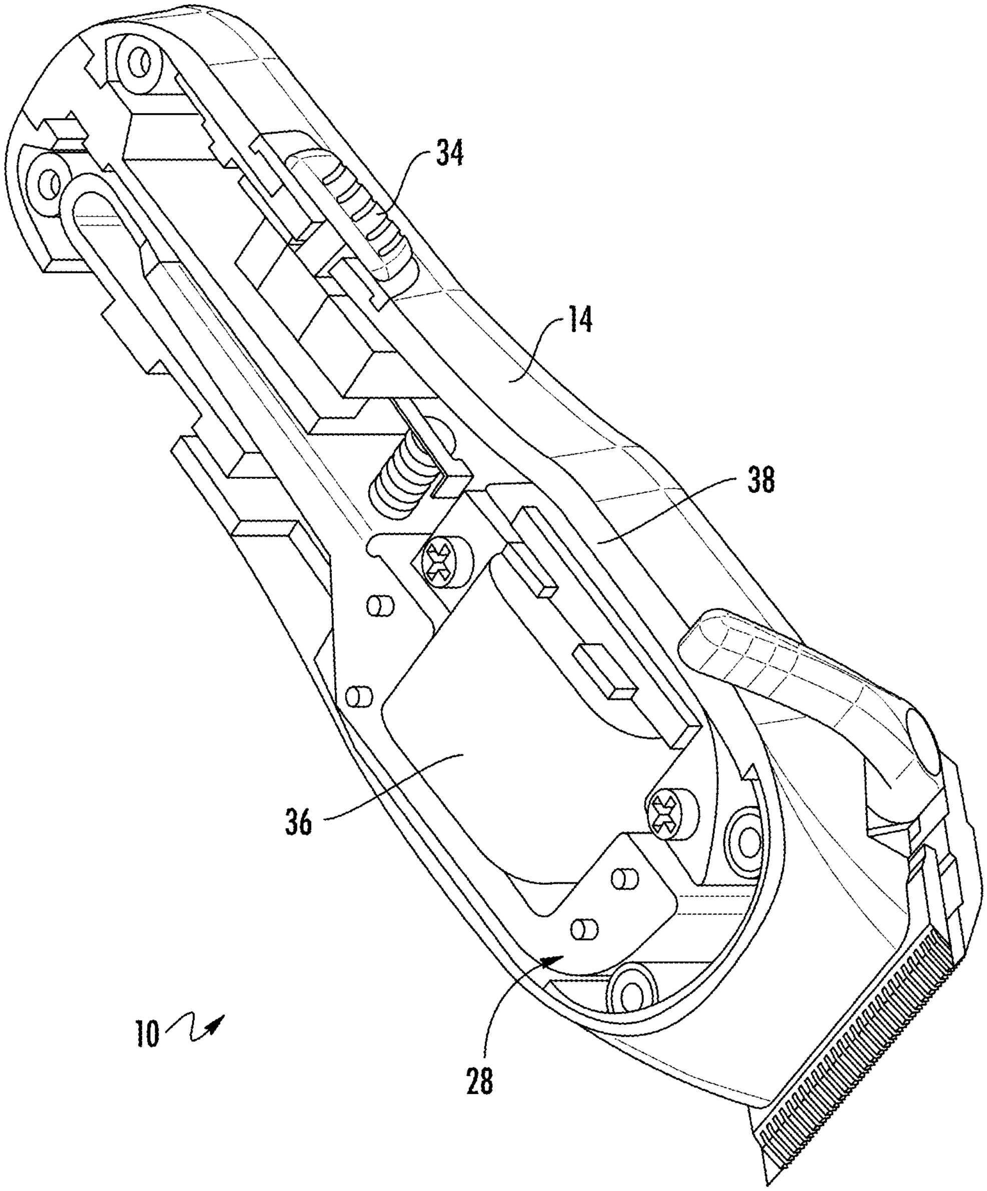
FIG. 2 is a perspective view of the hair cutter of FIG. 1 with the cover or upper housing removed, according to an exemplary embodiment.
Figure 3:
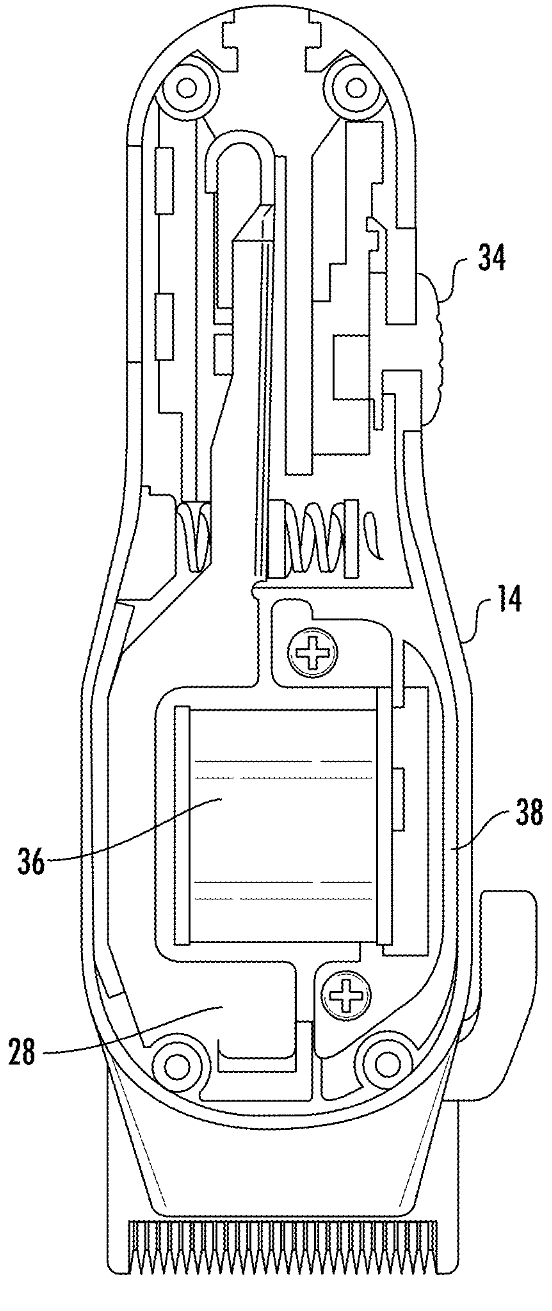
FIG. 3 is a top view of the hair cutter of FIG. 2, with the upper housing removed, according to an exemplary embodiment.

Referring to FIGS. 2-3, hair cutter 10 is depicted with upper housing 16 removed to illustrate drive assembly 28. In the illustrated embodiment, lower housing 14 contains drive assembly 28, which includes an electric motor 36. Electric motor 36 illustrated in FIG. 2 is a magnetic motor 36.

However, in other examples of embodiments, electric motor 36 can be a pivot motor, a rotary motor, or any other suitable motor for generating oscillating or reciprocating movement of the cutting head assembly 20.

Figure 4:
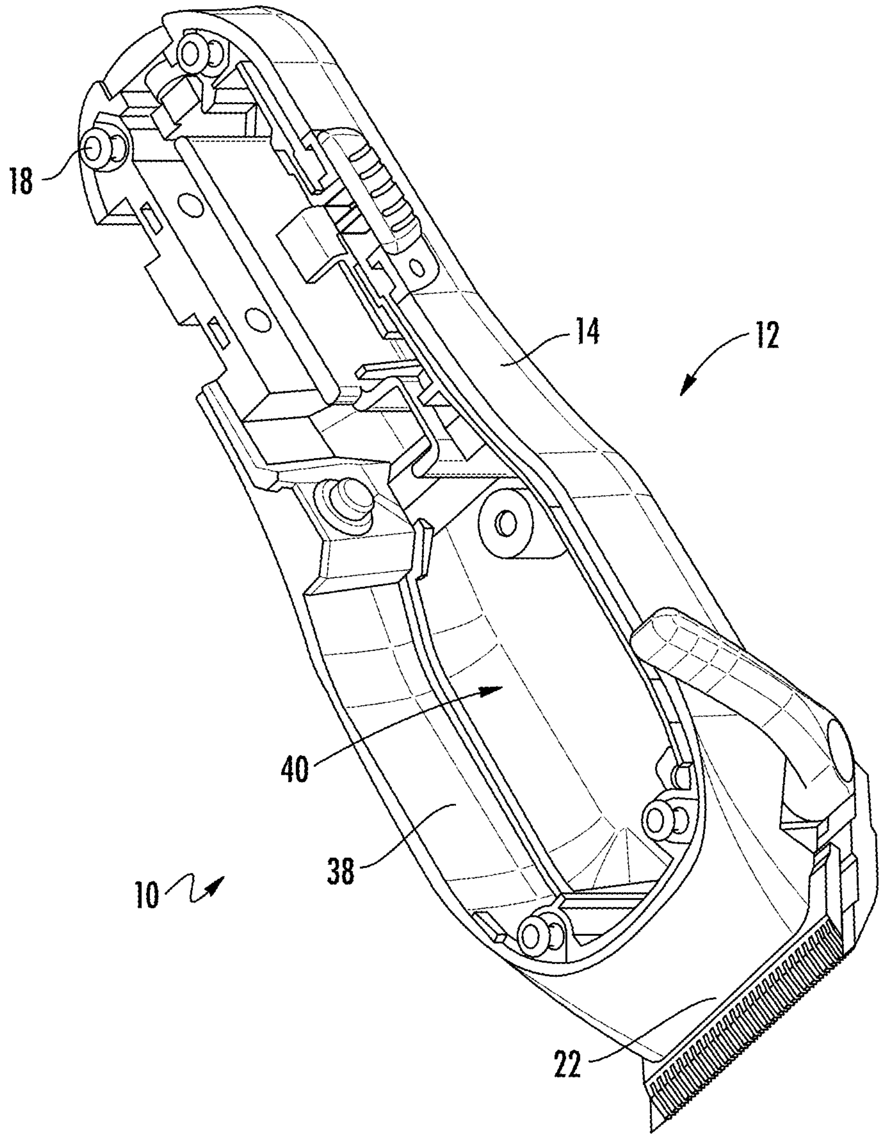
FIG. 4 is a perspective view of the hair cutter of FIG. 1, with both the cover and the drive assembly removed.

Referring now to FIG. 4, hair cutter 10 is depicted with both upper housing 16 and the drive assembly 28 removed. Lower housing 14 defines a substantially hollow cavity. In some embodiments, lower housing 14 is configured to receive a liner 38. The liner 38 can include an insulative liner 38 that nests into lower housing 14. The cavity defines a hollow portion or volume 40 that is configured to receive the drive assembly 28 (as shown in FIG. 3). In addition to being nested in lower housing 14, insulative liner 38 can be encased (or partially enclosed by or sandwiched between) upper housing 16 (shown in FIG. 1) and lower housing 14.

Figure 5:
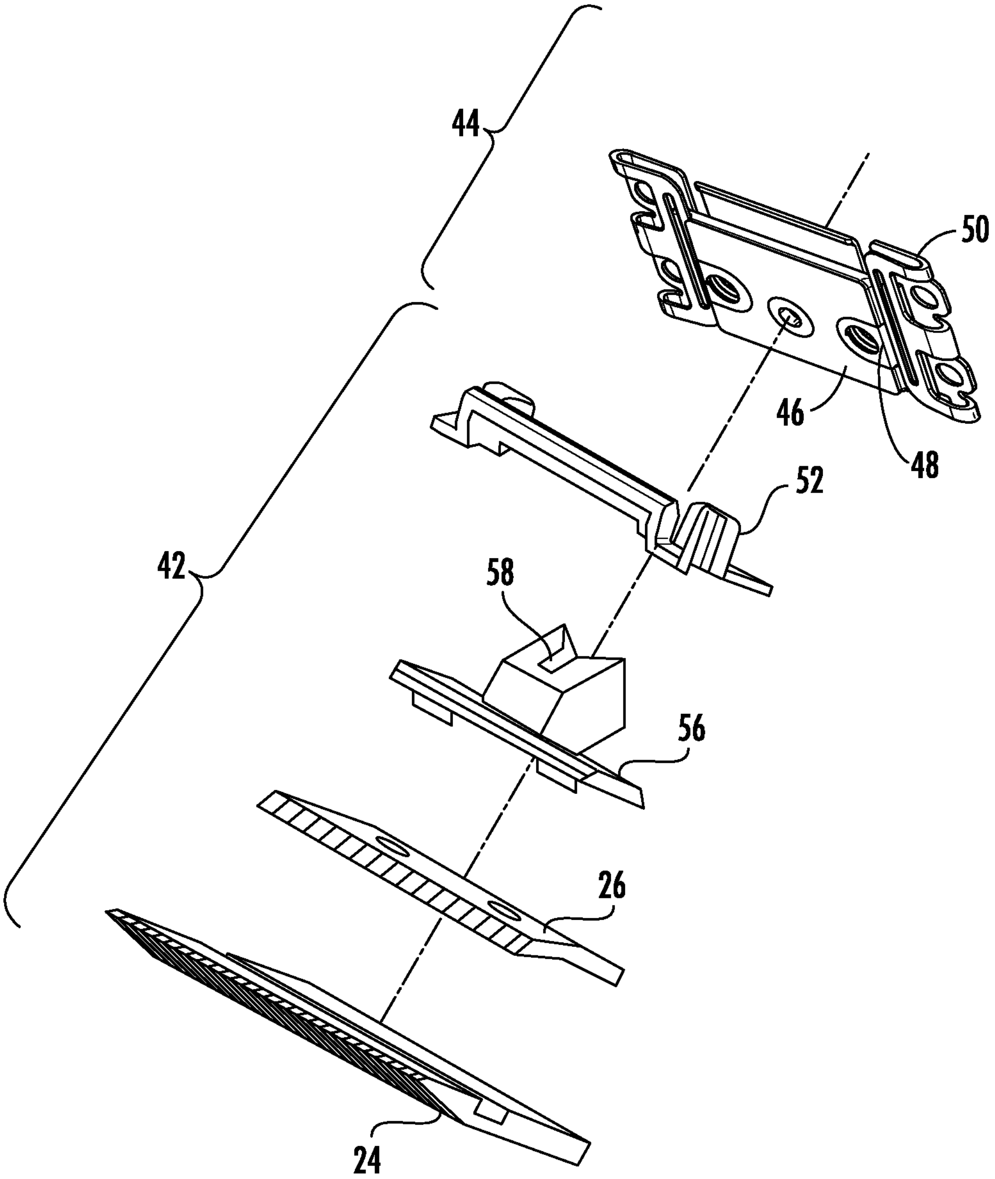
FIG. 5 is an exploded view of a blade assembly interconnecting to the pad assembly, according to an exemplary embodiment.

As illustrated in FIG. 5, an exploded blade assembly 42 is attached to a blade pad assembly 44 and located proximate the cutting or first end 22 of body 12, as illustrated in FIG. 1. Blade pad assembly 44 includes a damper or pad 46, a threaded insert 48 within pad 46 and a bracket 50 that partially surrounds the pad. In some embodiments, pad 46 and threaded insert 48 are a single integrated unitary part. Blade assembly 42 is captured between a blade frame 52 and blade pad assembly 44 to support the components of blade assembly 42 and interconnect blade assembly 42 to housing 14 and/or 16 of hair cutter 10. In some embodiments, bracket 50 captures threaded insert 48 within pad 46. Bracket 50, pad 46, and/or threaded insert 48 cover all or a part of inner blade 26. For example, bracket 50, pad 46, and/or threaded insert cover feet 54 of inner blade 26 to dampen operating loads and/or provide a counterweight while inner blade 26 oscillates over outer blade 24. Bracket 50 interconnects upper or lower housings 14 and/or 16 to blade assembly 42 and distributes operating loads of blade assembly 42 (e.g., inner and/or outer blades 26 and/or 24) to maintain a tensile force between the blades 26 and 24.

Blade set or assembly 42 includes an inner blade 26 and an outer blade 24. Inner and outer blades 26 and 24 are fabricated from a suitable material, such as a hard rubber, plastic, or polymer. In some embodiments, inner and outer blades 26 and 24 are fabricated from a metal or metal alloy.

Inner blade 26 is coupled to drive assembly 28 and/or motor 36 to move relative to the outer blade 24. Outer blade 24 can be coupled to blade pad assembly 44 (e.g., by fasteners 18 or fasteners 18). A suitable fastener 18 can be employed to secure outer blade 24 to blade pad assembly 44. Blade pad assembly 44 completely or partially captures inner blade 26. Inner blade 26 is coupled to a blade box 56 (e.g., by screws or a peg of blade box 56 inserted into holes on inner blade 26) and is biased toward outer blade 24 by a biasing blade frame 52. The blade frame 52 can couple to outer blade 24 with screws or other securing means. A yoke 58 of blade box 56 receives the eccentric (e.g., eccentric drive 60 illustrated in FIG. 6) from motor 36 to cause an oscillating motion from the output of motor 36. The eccentric drive 60 inserts into yoke 58, and inner blade 26 and the blade box 56 are supported such that inner blade 26 moves back and forth across outer blade 24 in response to movement of the eccentric (FIG. 6).

In some embodiments, blade pad assembly 44 interconnects blade frame 52 to outer blade 24. A threaded insert 48 is captured within blade pad assembly 44 between a bracket 50 and pad 46. In this configuration, blade pad assembly 44 captures blade frame 52 against inner blade 26 and interconnects outer blade 24 of blade assembly 42 to the cutter housing 14 and/or 16. This configuration stabilizes the forces generated by inner and outer blades 26 and 24 and provides for more consistent load distribution across blade assembly 42. This stabilization reduces the lubrication needed between the component parts of blade assembly 42. For example, the materials used to form blade frame 52 may be selected to reduce galling with the movable inner blade 26 as it oscillates relative to outer blade 24. This configuration may also reduce the energy required from motor 36 to oscillate inner blade 26.

Pad 46 provides a counter weight and/or dampens operating load that are absorbed in blade pad assembly 44 and/or damper pad 46. In various embodiments, pad 46 is fabricated from a metal, composite, or plastic material (e.g., a polymer, thermoplastic, and/or thermoset material). Various additives can be added to the pad material to increase a density and/or weight of pad 46. For example, pad 46 is a plastic or fiber material that includes a weighted constituent, such as a vulcanized rubber, metal, or heavy material to add weight to pad 46. Similarly, pad 46 may include an alloy or other weighted constituent to increase the density and/or weight of pad 46.

Figure 6:
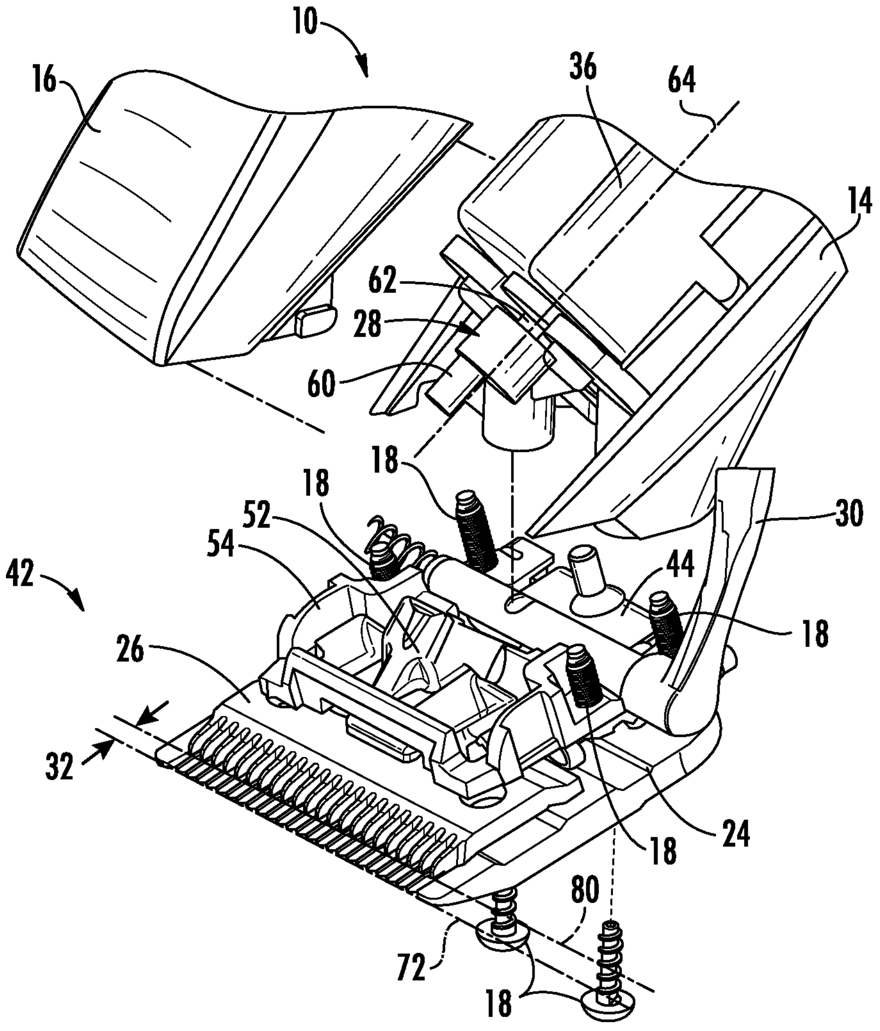
FIG. 6 is a partially exploded view with the blade assembly removed from the rest of the hair cutting apparatus.

FIG. 6 illustrates a hair cutter 10 having a lower housing 14 and an upper housing 16, an electric motor 36, a drive assembly 28, and a blade assembly 42. Upper housing 16 and lower housing 14 may collectively form housing body 12 of hair cutters 10, for example, in a clamshell configuration. As illustrated, upper housing 16 and lower housing 14 surround motor 36 and drive assembly 28. Lower and upper housing 14 and 16 can form the handheld body 12 of hair cutters 10 in any other suitable configuration. Electric motor 36 can operate with electric power, e.g., from batteries or electricity from a power outlet. Electric motor 36 includes a rotating output shaft 62 that rotates about an axis of rotation 64. The drive assembly 28 includes an eccentric drive 60 offset from the axis of rotation 64 of motor output shaft 62. As illustrated, outer blade 24 is attached to pad assembly 44 with fasteners 18 (e.g., fasteners 18 pass through outer blade 24 and couple to threaded insert 48 of pad assembly 44). Fasteners 18 couple bracket 50 of pad assembly 44 to hair cutter 10 body 12.

Figure 9:
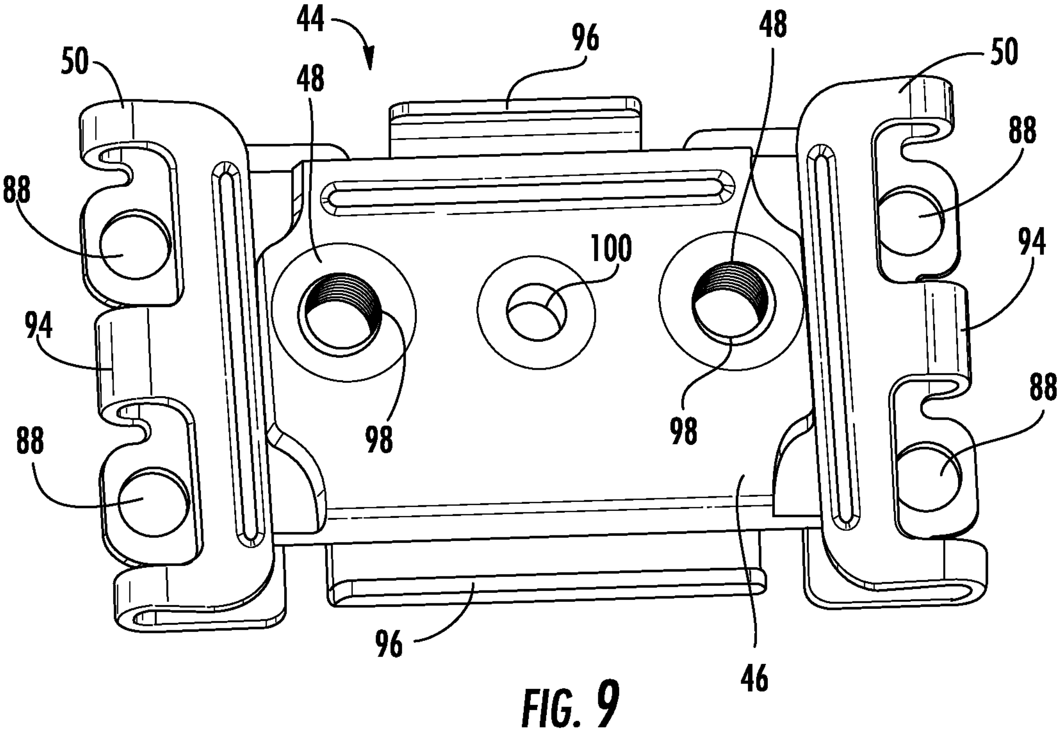
FIG. 9 is a top perspective view of the assembled pad assembly including the bracket, the blade pad, and the threaded insert, according to an exemplary embodiment.

Best illustrated in FIG. 9, pad assembly 44 includes a bracket 50, a pad 46, and a threaded insert 48. As shown above with reference to FIG. 6, fasteners 18 interconnect outer blade 24 to threaded insert 48 of pad assembly 44. Threaded insert 48 is insertably coupled with damper pad 46, e.g., in one or more slots 66.

Figure 7:
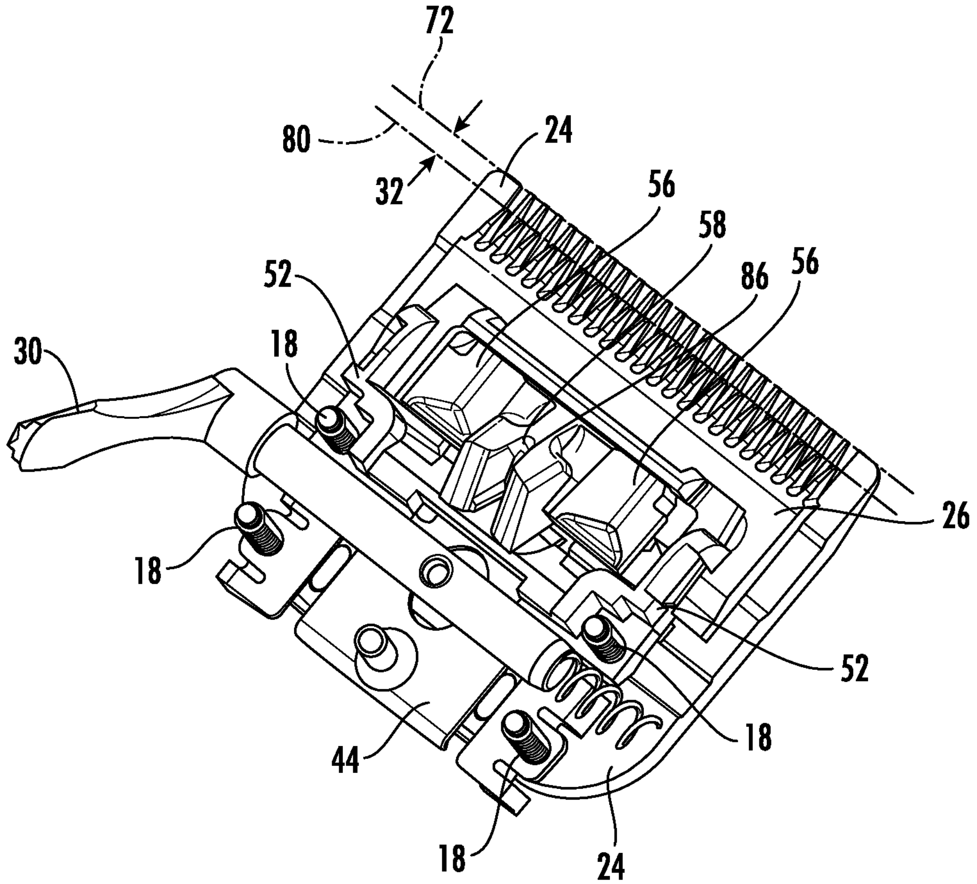
FIG. 7 is an isolated perspective view of the blade assembly with the housing and drive assemblies removed.
Figure 8:
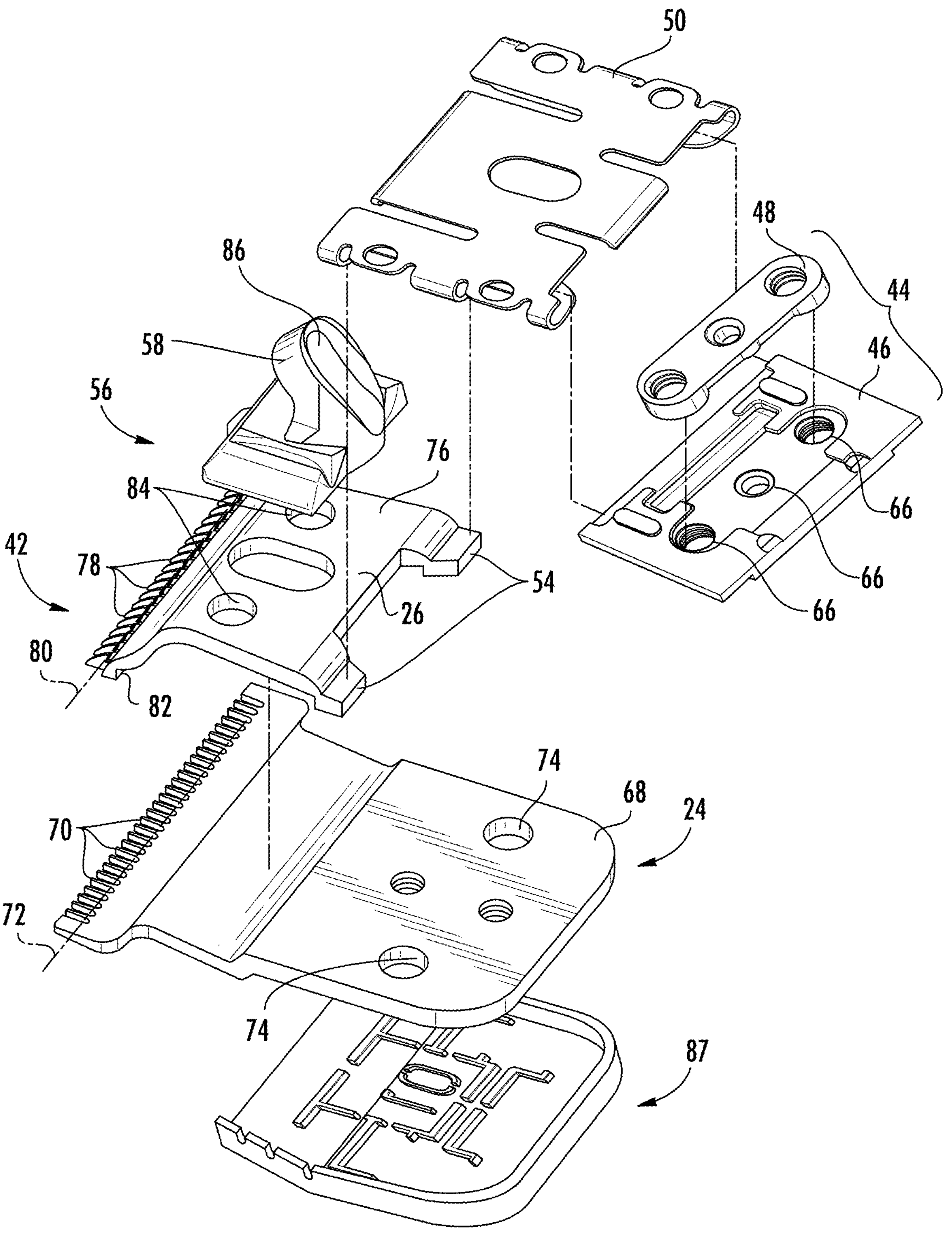
FIG. 8 is an exploded view of the blade assembly and the pad assembly interconnecting the inner blade to the outer blade, according to an exemplary embodiment.

FIG. 7 illustrates an assembled blade assembly 42 captured by pad assembly 44 (FIG. 9), which includes an inner blade 26, an outer blade 24, and a yoke 58. With reference to the exploded view of FIG. 8, outer blade 24 includes a main body 68 and a plurality of stationary or outer blade teeth 70. Outer blade teeth 70 extend along a nominal outer blade edge 72, which may be defined, for example, by a line connecting the roots of the teeth 70. Outer blade 24 also includes a pair of through-holes 74 for mounting blade assembly 42 to pad assembly 44 with fasteners 18. For example, fasteners 18 may pass between through-holes 74 to threadedly engage with threaded insert 48 of pad assembly 44.

The cutter, second blade, or inner blade 26 sits on top of outer blade 24 and includes a projection or feet 54 that fit between pad assembly 44 and outer blade 24 to capture inner blade 26. Yoke 58 is attached to inner blade 26 and sandwiched between inner blade 26 and the housing 14 and/or 16. Inner blade 26 includes a main body 76 and a plurality of oscillation or translating inner blade teeth 78 that oscillate relative to outer blade teeth 70. Inner blade teeth 78 extend along a nominal inner blade edge 80, which may be defined, for example, by a line connecting the roots of inner blade teeth 78. Inner blade 26 is positioned proximate outer blade 24 with inner blade edge 80 parallel to and offset from outer blade edge 72. Rearward of inner blade edge 80, on the bottom side of inner blade 26, is a depending guide surface 82 that is parallel to inner blade edge 80. Pad assembly 44 restricts movement of inner blade 26 perpendicular to outer blade edge 72.

A pair of feet 54 depend from the rear end of inner blade 26 main body 76. For example, inner blade teeth 78 are located on a first end of inner blade 26 and feet 54 are located on a second end of inner blade opposite the first end. Feet 54 insert and oscillate under a bracket 50 of pad assembly 44. Pad assembly 44 straddles inner blade 26 feet 54 and allows inner blade 26 to oscillate under bracket 50. Feet 54 can create a gap limiting the oscillations of inner blade 26 within the edges of bracket 50. The distance between feet 54 and edges of bracket 50 provides sufficient room for inner blade 26 to reciprocate with respect to outer blade 24. For example, inner blade 26 may oscillate between the edges of bracket 50 without feet 54 hitting bracket 50. Inner blade 26 main body 76 may include a pair of holes 84 for coupling inner blade 26 with yoke 58. In some embodiments, inner blade 26 and yoke 58 are a single integral part.

Yoke 58 sits on top of and is coupled to inner blade 26. For example, a pair of pegs (not shown) depending from the bottom of yoke 58 can be inserted into holes 84 in the main body 76 of inner blade 26 so that yoke 58 is captured and coupled to inner blade 26. Yoke 58 may be fastened to inner blade 26 with fasteners, screws, rivets, spot-welds, or coupled through other mechanical means. Yoke 58 includes a receiver 86 for receiving the eccentric drive 60 of the drive assembly 28.

Blade assembly 42 is captured by assembling pad assembly 44 over feet 54 of inner blade 26, and coupling pad assembly 44 to outer blade 24 (e.g., with fasteners 18 illustrated in FIG. 5). Inner blade 26 can then oscillate over outer blade 24 in between the edges of bracket 50 of pad assembly 44. Yoke 58 couples to inner blade 26 to receive the eccentric drive 60 and oscillate inner blade 26. Pad assembly 44 applies a downward biasing force on inner blade 26 and retains inner blade 26 relative to outer blade 24. Yoke 58 receives the input from the eccentric drive 60 and causes inner blade 26 to reciprocate relative to outer blade 24. The biasing force generated by pad assembly 44 captures inner blade 26 between yoke 58 and outer blade 24.

In some embodiments, a thermal barrier or blade cap 87 is releasably coupled to outer blade 24. Blade cap 87 protects the skin of a user from the frictional heat generated as the inner blade 26 oscillates over the outer blade 24 during operation. Blade cap 24 may be fabricated from the same material as inner and outer blades 26 and 24, or may be fabricated from a different material. For example, inner and outer blades 26 and 24 are fabricated from a metal or metallic alloy and blade cap 87 is fabricated from a polymer plastic, such as a thermoplastic or thermoset plastic. Blade cap 87 may be constructed in such a way as to include pockets for ambient air to pass between the blade cap 87 and blade assembly 42, to thermally insulate the heat generated during operation. In various embodiments, blade cap 87 is configured for a blade assembly 42 size and/or for a particular cutter 10. Specifically, blade cap 87 is configured for industry standard outer blade 24 sizes 4, 5, 7, 10, 15, 30, and 40.

Figure 10:
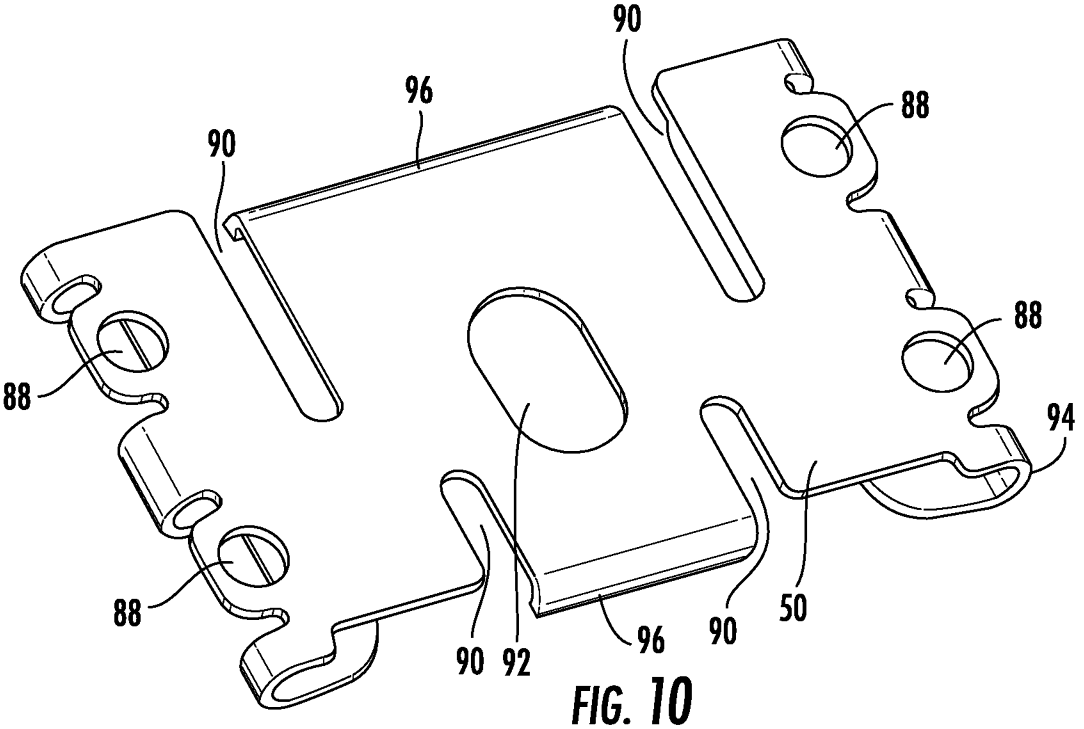
FIG. 10 is a detailed perspective view of the bracket, according to an exemplary embodiment.
Figure 14:
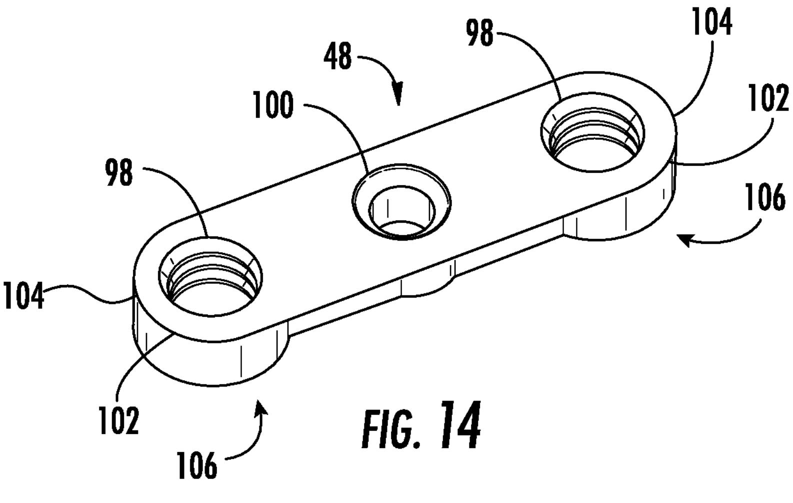
FIG. 14 is a bottom perspective view of another threaded insert, according to an exemplary embodiment.
Figure 15:
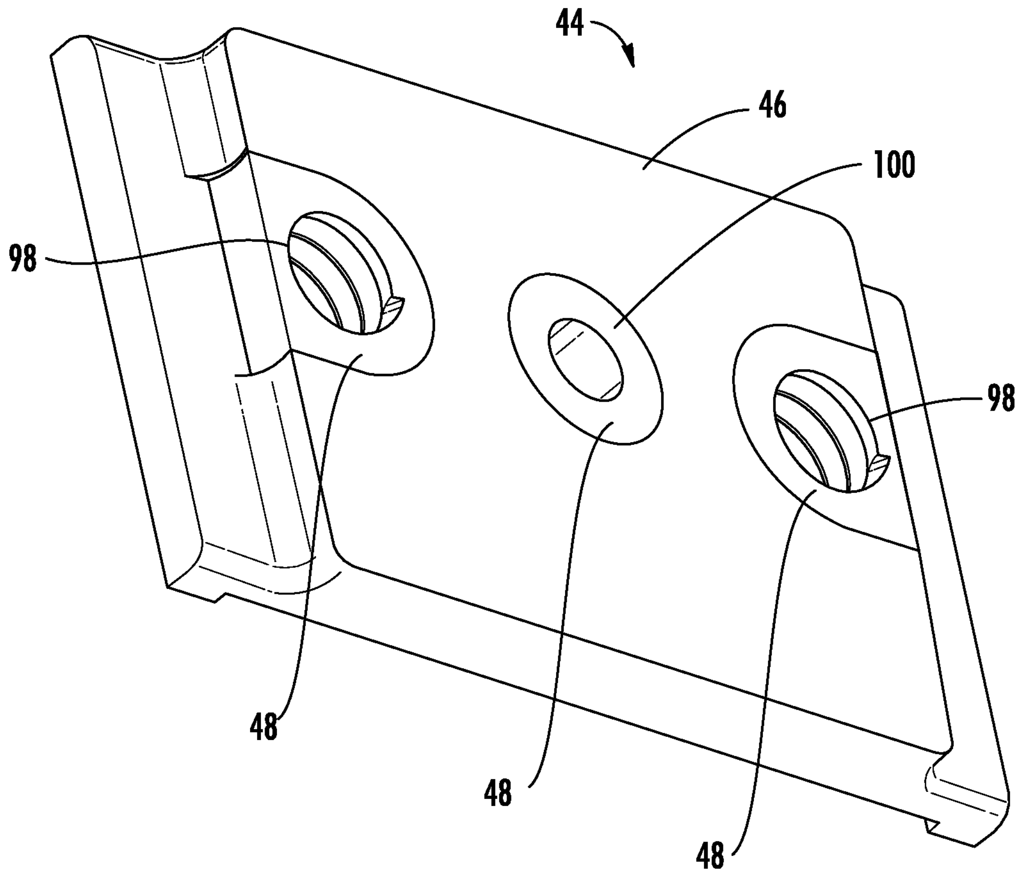
FIG. 15 is a perspective view of a threaded insert assembled within a blade pad, according to an exemplary embodiment.
Figure 16:
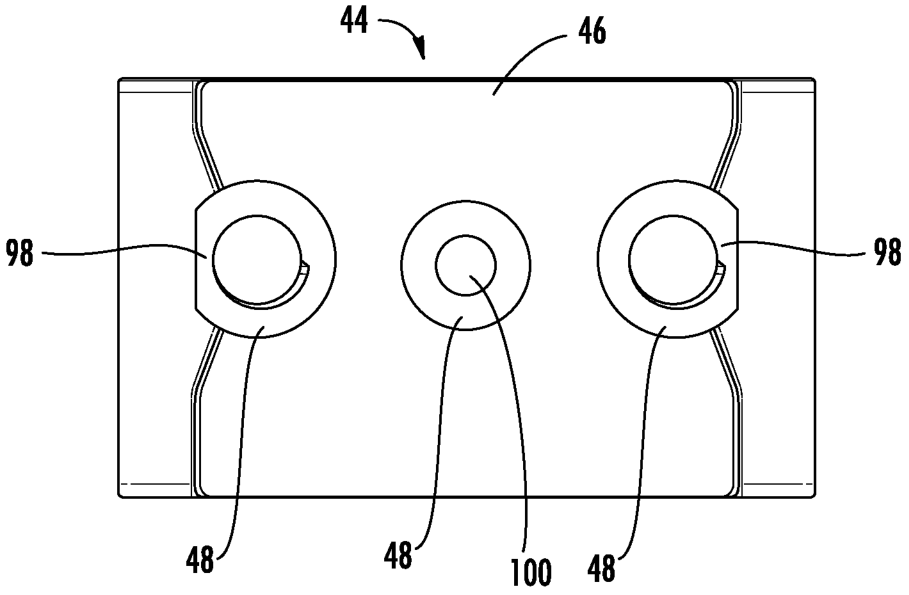
FIG. 16 is a top view of a threaded insert within a blade pad.
Figure 17:
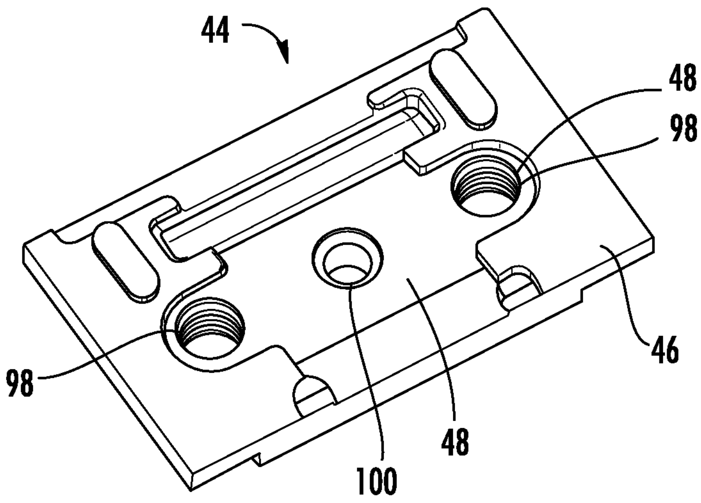
FIG. 17 is a bottom perspective view of a threaded insert within a blade pad; the bracket has been removed from the pad assembly to show the interconnection of the threaded insert and the blade pad, according to an exemplary embodiment.

FIG. 9 illustrates a fully assembled pad assembly 44 which includes a bracket 50, a pad 46, and a threaded insert 48. FIG. 10 is an isolated view of bracket 50 in pad assembly 44, illustrated in FIG. 9. FIGS. 11-14 are isolated views of various embodiments of threaded insert 48. FIGS. 15-17 are partial assemblies of pad assembly 44. Specifically, FIGS. 15-17 include threaded insert 48 and pad 46 with bracket 50 removed to illustrate how the assembly captures threaded insert 48.

With reference to FIG. 10, bracket 50 includes a series of bolt or screw holes 88 to pass a screw, bolt, or another fastener to connect bracket 50 to body 12 of cutter 10 (e.g., a screw may pass through the hole and into or through upper housing 16 and/or lower housing 14). Bracket 50 also includes fastener locations 90 where fasteners 18 passing through blade assembly 42 can pass through bracket 50 and into threaded insert 48. Opening 92 provides access from outer blade 24 of blade assembly 42 to taper lever 30 to allow translational movement of outer blade 24 relative to inner blade 26 to control cutting length without interference from pad assembly 44. As illustrated, bracket 50 includes a spring 94 (e.g., within bracket 50) to couple pad 46 to bracket 50 and retain pad 46 and threaded insert 48. Spring 94 provides a biasing force against blade assembly 42 and/or hair cutter 10 body 12 in operation to stabilize and distribute loads generated by operation of blade assembly 42. For example, spring 94 and/or bracket 50 provide a downward bias or force on pad 46 to capture pad against inner blade 26. Similarly, spring 94 can provide a downward or compressive bias or force on pad 46 to capture pad against bracket 50 and/or inner blade 26. Bracket 50 may include a lip 96 to retain pad 46 and threaded insert 48 within bracket 50 and secure pad assembly 44 over outer blade 24 and/or capture feet 54 of inner blade 26.

Any suitable material can form bracket 50. For example, bracket 50 may be a thermoset or thermoplastic material, a polycarbonate, a metal (e.g., a steel alloy), or another suitable material. The material of bracket 50 can reduce the lubrication needed between mating metallic parts, such as inner and outer blades 26 and 24. Since bracket 50 interconnects blade assembly 42 to body 12 of cutter 10, the material selected for bracket 50 may include materials selected for blade assembly 42 and/or attachment locations on body 12 of cutter 10. In some embodiments, the material selected may be similar but not identical to either blade assembly 42 or body 12. For example, bracket 50 may be the same or a related alloy of inner blade 26, outer blade 24, and/or blade assembly 42 or its components.

FIGS. 11A-E show detail views of an example embodiment of threaded insert 48. As illustrated, threaded insert 48 has two threaded regions 98 to receive fasteners 18 that attach blade assembly 42 to pad assembly 44. The threaded regions 98 are configured to receive a fastener 18 that couples damper pad 46 to threaded insert 48 trapped between pad 46 and bracket 50. As explained with reference to FIG. 10, bracket 50 has several screw holes 88 to attach bracket 50 of pad assembly 44 to body 12 of cutter 10. Fasteners 18 connect outer blade 24 of blade assembly 42 to the threaded region 98 of threaded insert 48 (illustrated in FIG. 6). Pad assembly 44 captures inner blade 26 against outer blade 24. Fasteners 18 couple bracket 50 of pad assembly 44 to body 12 or housing 14 and/or 16 of hair cutter 10 through screw holes 88 (illustrated in FIGS. 7, 10, and 19). Thus, pad assembly 44 interconnects the captured blade assembly 42 to cutter 10 body 12.

Figure 11A:
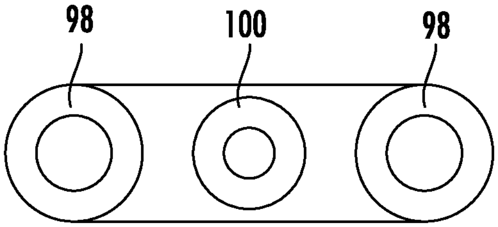
FIG. 11A is a top view of a threaded insert, according to an exemplary embodiment.
Figure 11B:
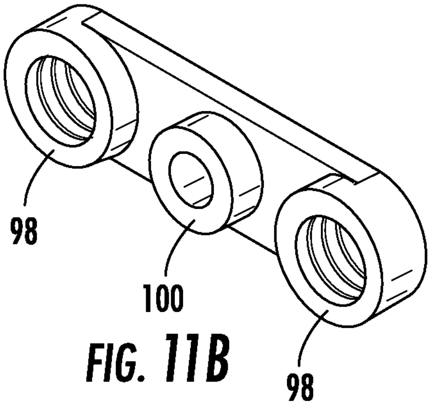
FIG. 11B is a side perspective view of the threaded insert of FIG. 11A.
Figure 11C:
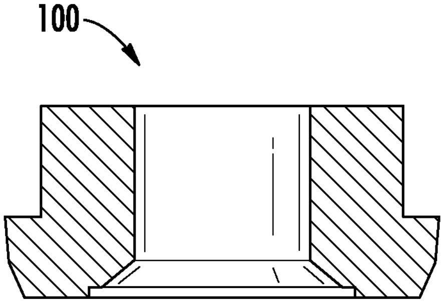
FIG. 11C is a cross-section view of the bore of the threaded insert of FIG. 11A
Figure 11D:
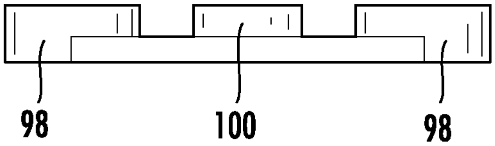
FIG. 11D is a side view of the threaded insert of FIG. 11A.
Figure 11E:
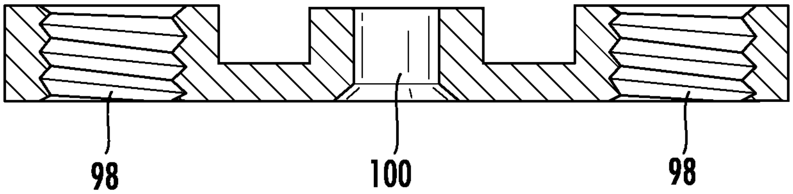
FIG. 11E is a side cross-sectional view of the threaded insert of FIG. 11A.

Best illustrated in FIG. 11C, threaded insert 48 may have a bore 100 in communication with opening 92 through bracket 50 (FIGS. 7 and 10). In some embodiments, bore 100 is countersunk to more tightly position or couple inner blade to taper lever. For example, countersunk bore 100 can be located between two threaded regions 98 on either side of bore 100. Bore 100 and threaded regions 98 are on a pad 46 and/or threaded insert 48. In various embodiments, pad 46 and threaded insert 48 are two separate parts coupled together, and in other embodiments, pad includes threaded regions 98 and forms a single unitary or integral part of pad 46 (and/or threaded insert 48). Bore 100 and opening 92 enable the connection of taper lever 30 to outer blade 24 to translate blade 24 (or blade 26) relative to inner blade 26 (or blade 24). (See FIG. 7). A similar design could couple taper lever 30 to inner blade 26 to translate inner blade 26 relative to outer blade 24. Bracket 50 may capture threaded insert 48 against pad 46 along the top surface of threaded insert 48 (FIG. 11A) and against bracket 50 along the bottom surface (FIG. 14). FIG. 11E illustrates the cross-sectional view of the threaded region 98 and bore 100 along a cross-section of threaded insert 48. Although FIGS. 11A-E show one example embodiment, other configurations, and dimensions are contemplated.

Figure 12:
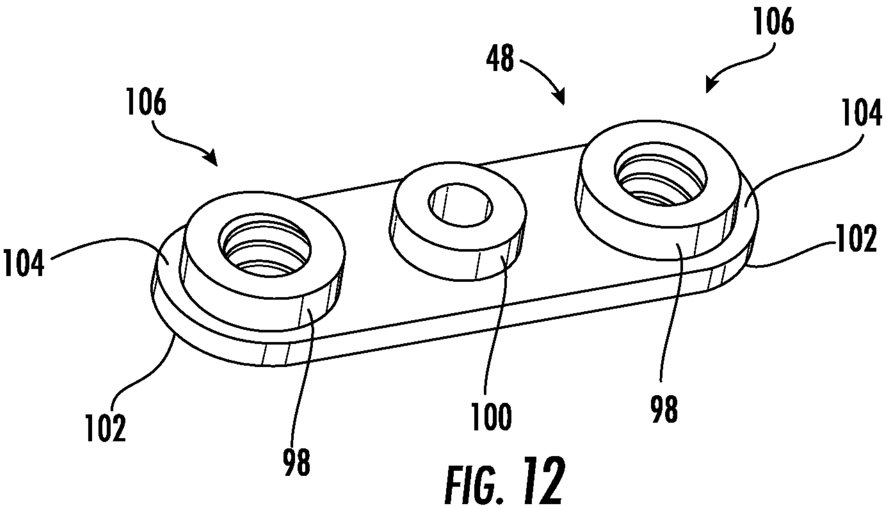
FIG. 12 is a top perspective view of another threaded insert, according to an exemplary embodiment.

For example, FIG. 12 shows a top perspective view of another embodiment of a threaded insert 48. Threaded insert 48 includes a threaded region 98 and a bore 100. In some embodiments, an edge 102 of surfaces 104 extend beyond threaded regions 98 to better capture threaded insert 48 between bracket 50 and pad 46. For example, surface 104 on outer edge 102 of threaded insert 48 extends beyond threaded region 98. Edge 102 of surface 104 fits into a pocket or slot 66 of pad 46 to capture threaded insert 48 between bracket 50 and pad 46.

Figure 13:
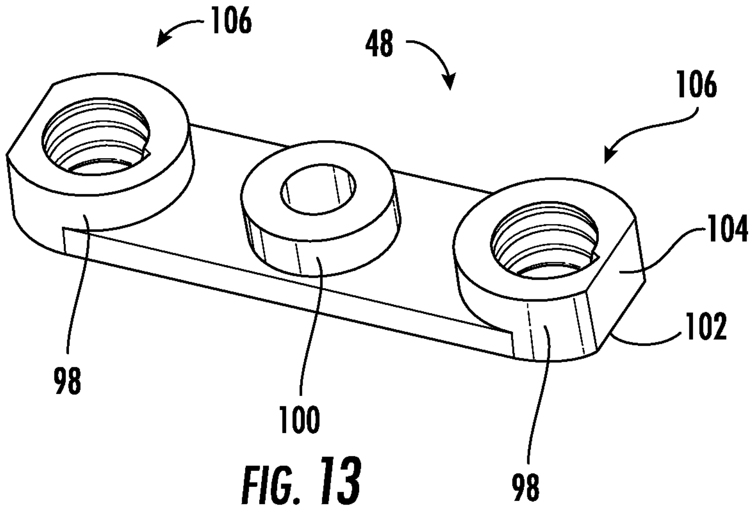
FIG. 13 is a top perspective view of another threaded insert, according to an exemplary embodiment.

FIG. 13 illustrates another top perspective view of threaded insert 48 where sides of threaded insert 48 are trimmed to align within pockets or slots 66 of pad 46.

FIG. 14 shows a bottom perspective view of a threaded insert 48 with no edge and no trim, resulting in circular regions 106 interconnected by slots along pad 46. For example, threaded insert 48 has an edge 102 at a circular region 106 that interconnects with circular slots 66 within pad 46.

FIGS. 15-17 present various views of threaded insert 48 coupled to pad 46. Threaded insert 48 provides a threaded region 98 to connect fasteners 18 to pad assembly 44, and pad 46 provides a stabilizing space and counterweight for interconnecting blade assembly 42 to body 12 of cutter 10. When pad 46 is coupled to bracket 50, it captures threaded insert 48 within the assembly to set tension accurately and repeatably on inner and outer blades 26 and 24 during operation of cutter 10 (FIG. 7).

Since pad 46 interconnects blade assembly 42 to body 12 of cutter 10, the material selected for pad 46 may include materials selected for blade assembly 42 and/or attachment locations on body 12 of cutter 10. Pad 46 may be made of a suitable material including a thermoset or thermoplastic material, a polycarbonate, and/or a metal (e.g., a steel alloy). In some embodiments, pad 46 is the same material as at least one of the inner and/or outer blades 26 and/or 24. The material of pad 46 can reduce the lubrication needed between mating parts. In some embodiments, the material selected may be similar but not identical to either blade assembly 42 or body 12. For example, pad 46 may be a related alloy of blade assembly 42 or body 12. In some embodiments, threaded insert 48 and pad 46 may be a single integral part.

Figure 18:
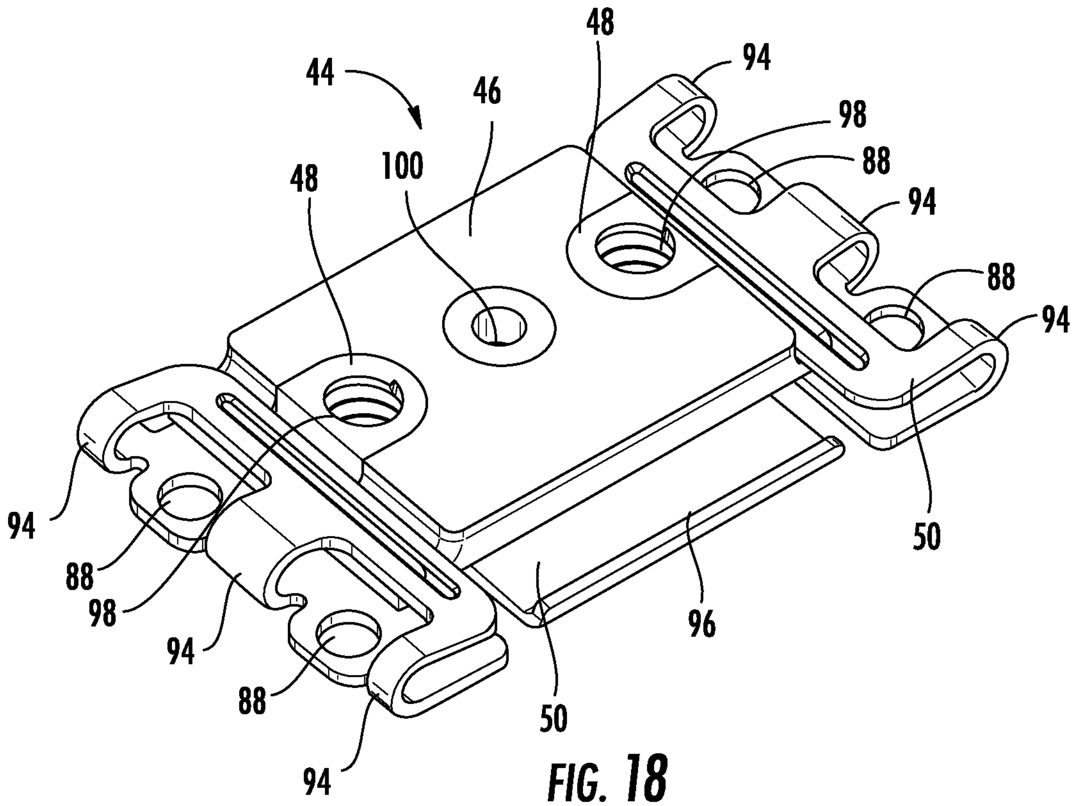
FIG. 18 is a top perspective view of a pad assembly that illustrates the interconnection of the blade pad, bracket, and threaded insert, according to an exemplary embodiment.

FIG. 18 shows a complete pad assembly 44 according to an exemplary embodiment. Bracket 50 and pad 46 couple to capture threaded insert 48 to form an assembled pad assembly 44. Spring 94 provides a downward force against pad 46 to capture pad 46 against bracket 50. Spring 94 also provides support to outer blade 24 against body 12 (illustrated in FIG. 19). Screw holes 88 provide access to fasteners 18 to connect pad assembly 44 to body 12. Threaded regions 98 of threaded insert 48 provide a location for fasteners 18 to connect pad assembly 44 to outer blade 24. Lip 96 ensures that pad 46 remains within bracket 50. Bore 100 provides a rod or pin connection from taper lever 30 to inner or outer blade 26 or 24.

Figure 19:
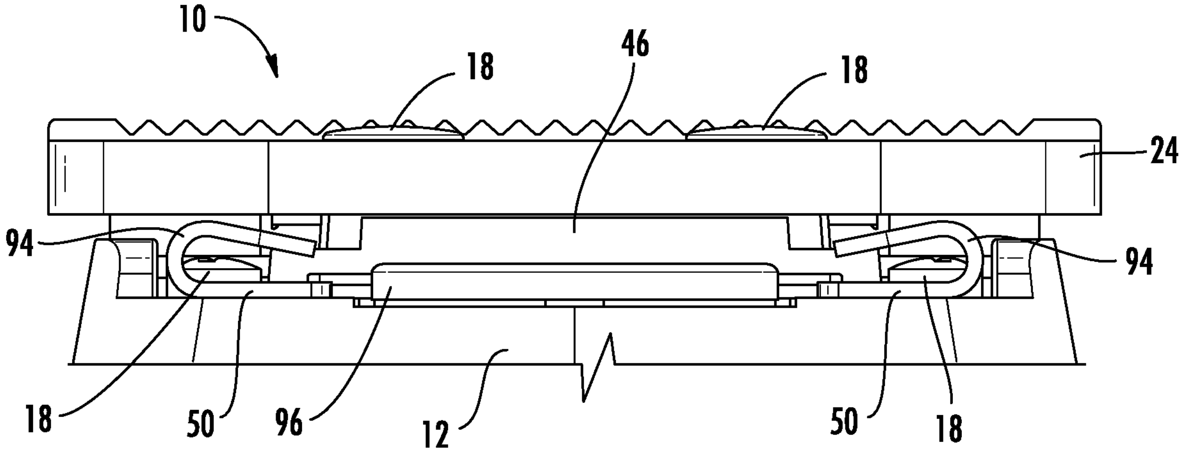
FIG. 19 is a side view of the pad assembly interconnecting the blade assembly to the cutter housing, according to an exemplary embodiment.

FIG. 19 illustrates a side view of the backside of a cutter 10. As illustrated, fasteners 18 couple pad assembly 44 to body 12 of cutter 10. Fasteners 18 pass through outer blade 24 and connect to the threaded regions 98 within pad 46 or threaded insert 48. Bracket 50 includes spring 94 that biases outer blade 24 against body 12 and ensures that a tensile force remains on outer blade 24 relative to inner blade 26 (not shown) during operation of cutter 10. Spring 94 also ensures repeatable and accurate load and force distribution across blade assembly 42.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An assembly for a hair clipper, comprising:

a blade assembly including:

a translating blade including first teeth;

a stationary blade including second teeth and coupled to the translating blade, the translating blade and the first teeth oscillate relative to the stationary blade and the second teeth; and a blade pad assembly, including:

a pad, the pad comprising at least one circular slot;

a threaded insert, the threaded insert comprising at least one threaded region; and a bracket that captures the threaded insert to couple the threaded insert within the pad.

2. The assembly of claim 1, further comprising a spring positioned within the bracket that provides a downward force on the pad to capture the pad against the bracket.

3. The assembly of claim 2, wherein the spring biases the stationary blade to maintain a tensile force between the translating blade and the stationary blade.

4. The assembly of claim 1, further comprising a lever coupled to the translating blade, the lever rotates and moves the first teeth relative to the second teeth such that when the lever is rotated a size of a gap between the first teeth and the second teeth is changed.

5. The assembly of claim 4, wherein the bracket further comprises an opening providing access from the translating blade to the lever allowing translational movement of the translating blade.

6. The assembly of claim 1, wherein the threaded insert includes a countersunk bore and the at least one threaded region is a pair of threaded regions with one of the pair of threaded regions located on either side of the countersunk bore.

7. The assembly of claim 6, wherein the threaded insert further includes a pair of surfaces on opposing outer edges of the threaded insert, the outer edges extending beyond the pair of threaded regions to fit within the pad.

8. The assembly of claim 6, wherein each of the threaded regions receives a fastener to couple the blade assembly to the blade pad assembly.

9. A hair clipper, comprising:

a housing;

a motor supported within the housing;

a blade assembly, the blade assembly comprising:

an outer blade; and an inner blade coupled to the outer blade to translate relative to the outer blade, the inner blade being coupled to the motor to translate the inner blade relative to the outer blade;

a blade pad assembly, including:

a damper pad;

a threaded insert that couples to the damper pad; and a bracket comprising a lip configured to retain the damper pad and the threaded insert within the bracket.

10. The hair clipper of claim 9, the inner blade comprising:

inner blade teeth that are positioned on a first end of the inner blade; and a pair of projections that are positioned on a second end of the inner blade located opposite the first end.

11. The hair clipper of claim 10, wherein at least one of the the bracket, the damper pad, and the threaded insert covers the pair of projections of the inner blade and distributes operating loads on the blade assembly to maintain a tensile force between the inner blade and the outer blade.

12. The hair clipper of claim 9, wherein the threaded insert and the damper pad are fabricated as a single integral part.

13. The hair clipper of claim 9, the hair clipper further comprising a pair of threaded regions of the threaded insert, the threaded regions receiving fasteners to the blade pad assembly and the housing.

14. The hair clipper of claim 9, further comprising a yoke coupled to the inner blade, the yoke coupling to an eccentric drive coupled to the motor, wherein movement of the eccentric drive translates the inner blade relative to the outer blade.

15. A hair clipper, comprising:

a housing;

a motor supported within the housing;

a blade assembly, comprising:

an outer blade; and an inner blade coupled to the outer blade to translate relative to the outer blade, the inner blade being coupled to the motor to translate the inner blade relative to the outer blade;

a blade pad assembly, the blade pad assembly comprising:

a bracket, the bracket interconnecting the housing to the blade assembly;

a damper pad that covers the inner blade; and a threaded insert captured within the blade pad assembly between the bracket and the damper pad.

16. The hair clipper of claim 15, wherein the damper pad is formed from a plastic material or a fiber material having a predetermined weight.

17. The hair clipper of claim 16, wherein the bracket further comprises a spring and wherein the predetermined weight of the damper pad and the spring cooperate to provide a downward force on the blade assembly.

18. The hair clipper of claim 15, wherein the motor is coupled to an eccentric drive to form a drive assembly.

* * * * *